United States Patent
Oono

(10) Patent No.: US 11,192,254 B2
(45) Date of Patent: Dec. 7, 2021

(54) ROBOT SYSTEM AND ADJUSTMENT METHOD THEREFOR

(71) Applicant: FANUC CORPORATION, Yamanashi (JP)

(72) Inventor: Kenshirou Oono, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 281 days.

(21) Appl. No.: 16/676,764

(22) Filed: Nov. 7, 2019

(65) Prior Publication Data

US 2020/0189111 A1 Jun. 18, 2020

(30) Foreign Application Priority Data

Dec. 18, 2018 (JP) .............................. JP2018-236309

(51) Int. Cl.
*B25J 9/16* (2006.01)

(52) U.S. Cl.
CPC ........... *B25J 9/1692* (2013.01); *B25J 9/1664* (2013.01); *B25J 9/1697* (2013.01)

(58) Field of Classification Search
CPC ...... B25J 9/1664; B25J 9/1692; B25J 9/1697; B25J 13/08; B25J 13/089; B25J 19/023
See application file for complete search history.

(56) References Cited

U.S. PATENT DOCUMENTS

| 8,326,460 | B2 * | 12/2012 | Ban | B25J 9/1697 |
| | | | | 700/259 |
| 8,352,076 | B2 * | 1/2013 | Someya | B25J 9/1697 |
| | | | | 700/259 |
| 9,393,696 | B2 * | 7/2016 | Hayashi | B25J 9/1697 |
| 2018/0222056 | A1 | 8/2018 | Suzuki et al. | |
| 2018/0250814 | A1 | 9/2018 | Hashimoto et al. | |
| 2018/0338090 | A1 * | 11/2018 | Iida | G06T 7/73 |

FOREIGN PATENT DOCUMENTS

| JP | 2004249391 A | * | 9/2004 | ............ B25J 9/1612 |
| JP | 2008183690 A | * | 8/2008 | |
| JP | 2009-220184 A | | 10/2009 | |
| JP | 2009-269155 A | | 11/2009 | |
| JP | 2018-001381 A | | 1/2018 | |
| JP | 2018-051671 A | | 4/2018 | |
| JP | 2018-126835 A | | 8/2018 | |
| WO | 2017/033357 A1 | | 3/2017 | |

\* cited by examiner

*Primary Examiner* — Abby Y Lin
*Assistant Examiner* — Dylan Brandon Mooney
(74) *Attorney, Agent, or Firm* — Maier & Maier, PLLC

(57) ABSTRACT

The present disclosure is a robot system including a robot that performs work on a workpiece; a controller that controls the robot; a first camera that captures an image of the workpiece while being moved relative to the workpiece by means of the operation of the robot; and a second camera that is capable of acquiring, in synchronization with image capturing by the first camera, an image that represents the relative positional relationship between the first camera and the workpiece. The controller includes a correcting unit that corrects, on the basis of the image acquired by the second camera, the image-capturing timing of the first camera so that an image is captured at a position at which the workpiece is appropriately captured in the field of view of the first camera.

9 Claims, 5 Drawing Sheets

ROBOT SYSTEM AND ADJUSTMENT METHOD THEREFOR

CROSS-REFERENCE TO RELATED APPLICATIONS

This application is based on Japanese Patent Application No. 2018-236309, the contents of which are incorporated herein by reference.

FIELD

The present invention relates to a robot system and an adjustment method therefor.

BACKGROUND

There is a known robot system in which a camera that captures an image of a workpiece is mounted at a distal end of a wrist, the camera is positioned at the workpiece by actuating the robot, and the robot is positioned with respect to the workpiece by controlling the robot on the basis of the image of the workpiece captured by the camera (for example, see Japanese Unexamined Patent Application, Publication No. 2009-220184).

SUMMARY

An aspect of the present invention is a robot system including: a robot that performs work on a workpiece; a controller that controls the robot; a first camera that captures an image of the workpiece while being moved relative to the workpiece by means of the operation of the robot; and a second camera that is capable of acquiring, in synchronization with image capturing by the first camera, an image that represents the relative positional relationship between the first camera and the workpiece, wherein the controller includes a correcting unit that corrects, on the basis of the image acquired by the second camera, the image-capturing timing of the first camera so that an image is captured at a position at which the workpiece is appropriately captured in the field of view of the first camera.

Another aspect of the present invention is a robot system including: a robot that performs work on a workpiece; a controller that controls the robot; and a first camera that captures an image of the workpiece while being moved relative to the workpiece by means of the operation of the robot, wherein, in synchronization with image capturing by the first camera, the controller includes a correcting unit that corrects, on the basis of the image that represents the relative positional relationship between the first camera and the workpiece, and that is acquired by a second camera, the image-capturing timing of the first camera so that an image is captured at a position at which the workpiece is appropriately captured in the field of view of the first camera.

Another aspect of the present invention is a robot system adjustment method including: capturing, while changing the position of a first camera relative to a workpiece by means of the operation of a robot, an image of the workpiece by means of the first camera; acquiring, by means of a second camera, an image that represents the relative positional relationship between the first camera and the workpiece in synchronization with the image capturing by the first camera; and correcting, on the basis of the image acquired by the second camera, the image-capturing timing of the first camera so that the image is captured at a position at which the workpiece is appropriately captured in the field of view of the first camera.

DETAILED DESCRIPTION

A robot 2 is, for example, a vertical articulated robot. The type of the robot 2 is not limited thereto, and a robot 2 of another arbitrary type may be employed.

A workpiece W has, for example, a prescribed shape and is provided on a table 6 or on a conveyor in an arbitrary orientation.

Processing that the robot 2 performs on the workpiece W may be arbitrary processing such as handling of the workpiece W. In the case of handling of the workpiece W, the robot 2 needs to ascertain the orientation of the workpiece W before gripping the workpiece W with a hand (not shown) attached to a distal end thereof.

Figure 1:
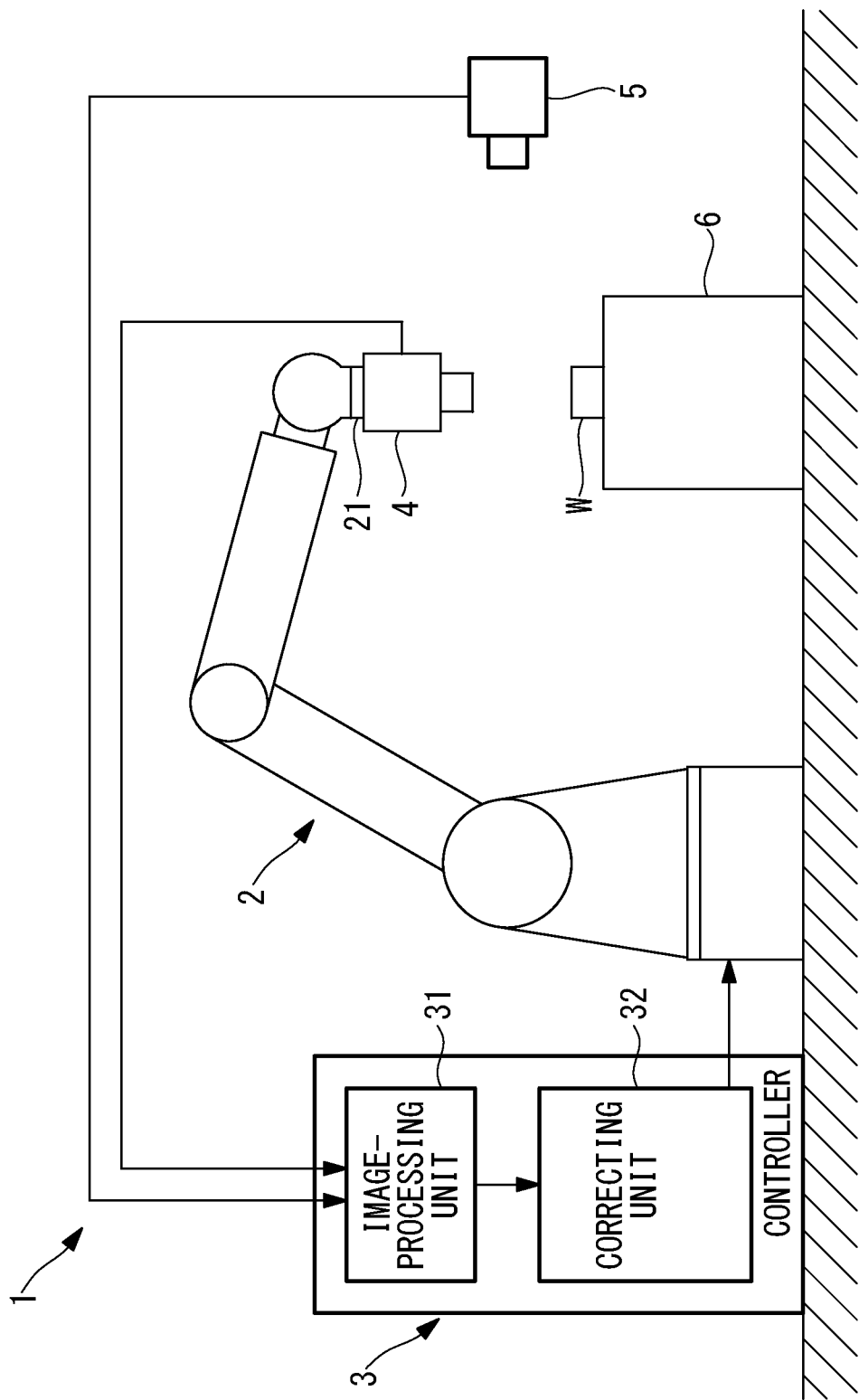
FIG. 1 is an overall configuration diagram showing a robot system according to an embodiment of the present invention.

In the example shown in FIG. 1, a first camera 4 is secured to a wrist distal end 21 of the robot 2. Accordingly, the first camera 4 is moved relative to the workpiece W when the robot 2 is actuated. Then, the first camera 4 captures an image of the workpiece W at a set timing. The field of view of the first camera 4 is relatively small but large enough to capture the workpiece W therein.

Figure 2:
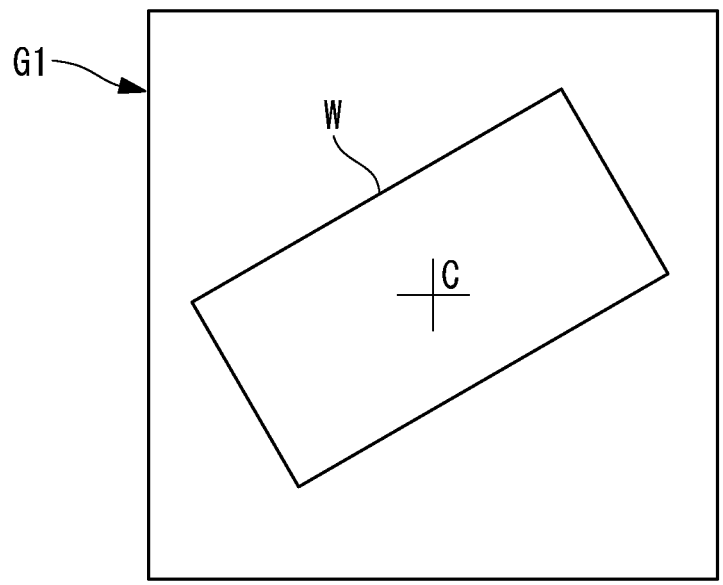
FIG. 2 is a diagram showing an example of a workpiece image acquired by a first camera of the robot system in FIG. 1 at an appropriate image-capturing timing.
Figure 3:
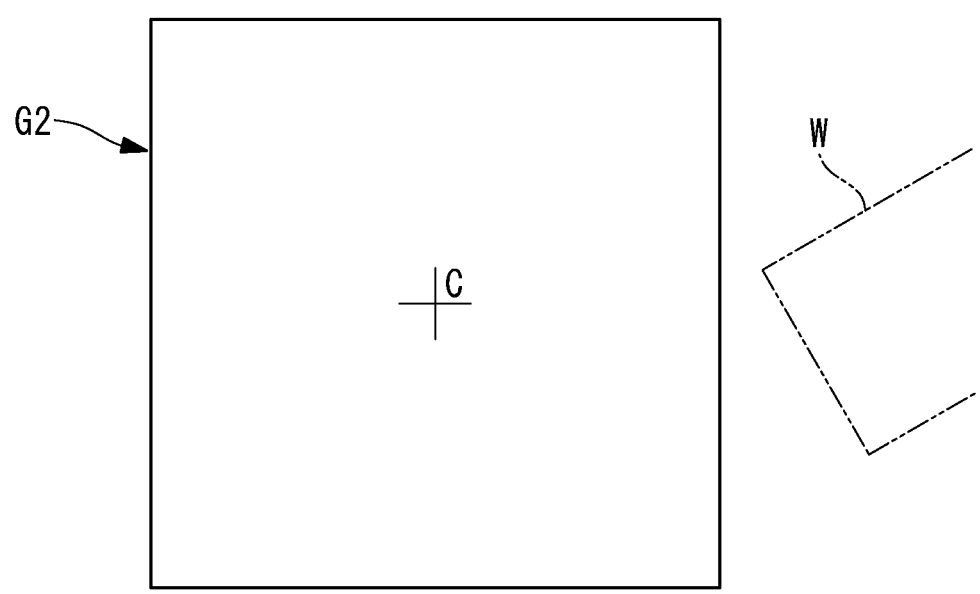
FIG. 3 is a diagram showing an example of a workpiece image acquired by the first camera of the robot system in FIG. 1 at an inappropriate image-capturing timing.

The image-capturing timing of the first camera 4 with respect to the workpiece W is initially set, in an intuitive manner, by a user who teaches an operation program. An image G1 that should be acquired by the first camera 4 is an image in which the workpiece W is disposed at a center C of the field of view, for example, as shown in FIG. 2. However, with the image-capturing timing that is initially set in an intuitive manner, the workpiece W is displaced from the state in FIG. 2 in the case in which the operating velocity of the robot 2 is high, and the workpiece W is also displaced from the state in FIG. 2 with a decrease in the size of the field of view of the first camera 4, and thus, there are cases in which the workpiece W is not captured in the field of view in an acquired image G2, as shown in FIG. 3.

Figure 4:
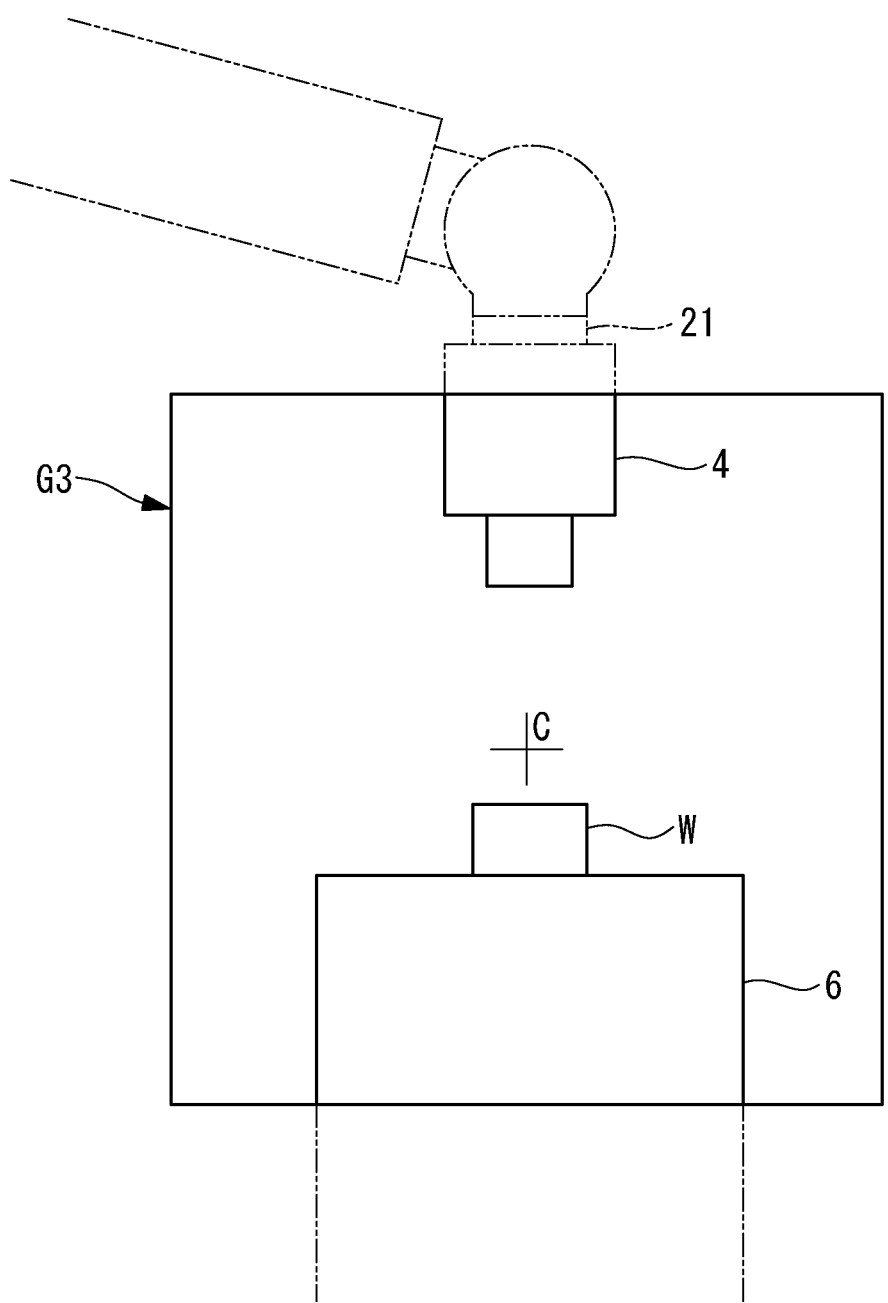
FIG. 4 is a diagram showing an example of an image acquired by a second camera of the robot system in FIG. 1 at the image-capturing timing in FIG. 2.

A second camera 5 is secured outside the robot 2 with the optical axis thereof arranged in a direction that intersects the direction in which the robot 2 moves when the image of the workpiece W is captured by the first camera 4, and captures, at the same time, an image of the first camera 4 secured to the robot 2 and an image of the workpiece W in synchronization with the first camera 4 capturing the image of the workpiece W. As shown in FIG. 4, the second camera 5 has the field of view that is larger than the field of view of the first camera 4 such that the size thereof is large enough to capture the first camera 4 and the workpiece W at the same time, as shown in FIG. 4.

A controller 3 includes: an image-processing unit 31 that processes an image G3 acquired by the second camera 5; and a correcting unit 32 that corrects, on the basis of the image G3 processed by the image-processing unit 31, the image-capturing timing of the first camera 4 so that the workpiece W is appropriately captured in the field of view of the first camera 4. The image-processing unit 31 and the correcting unit 32 are constituted of processors.

Figure 5:
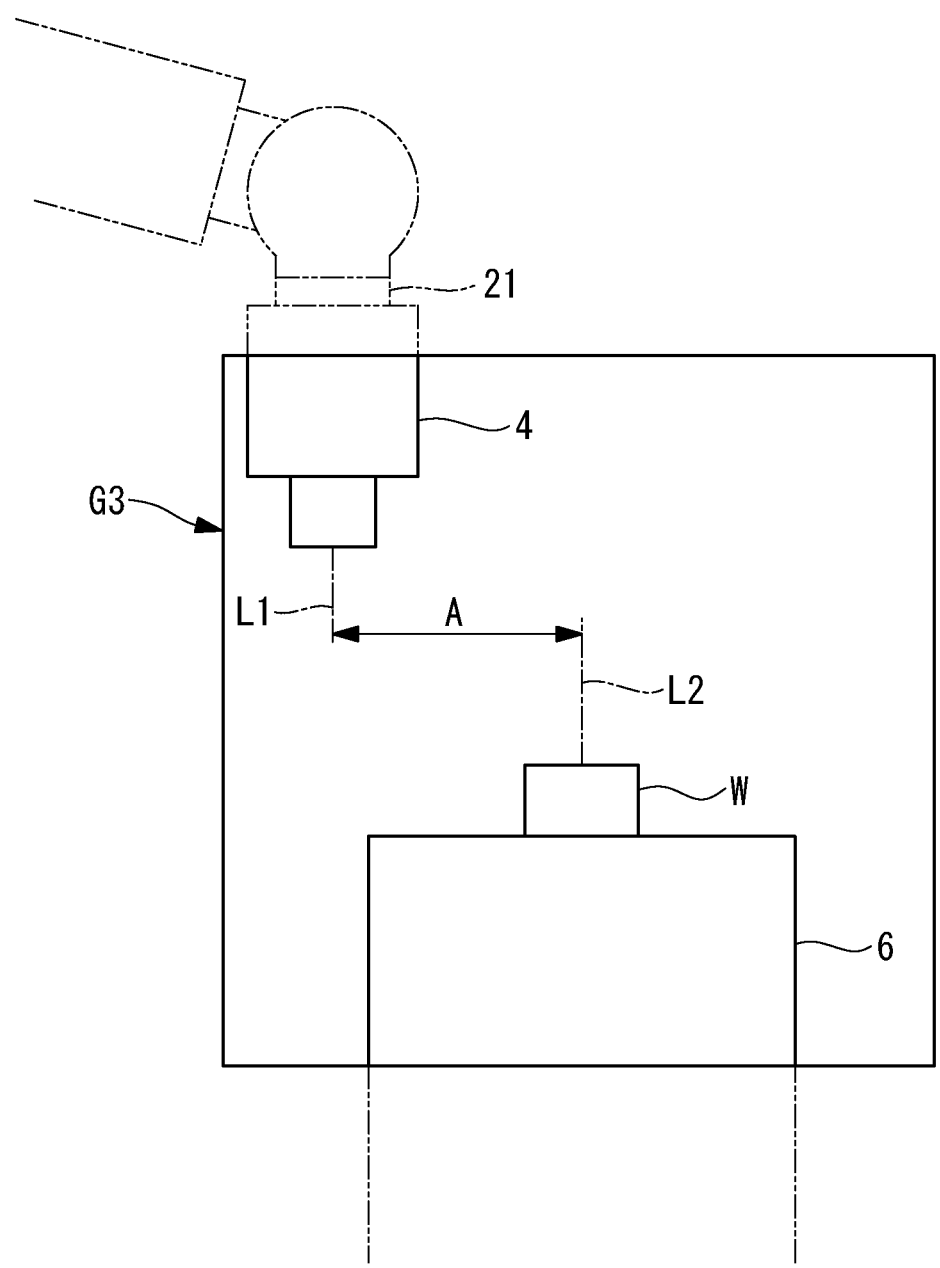
FIG. 5 is a diagram showing an example of an image acquired by a second camera of the robot system in FIG. 1 at the image-capturing timing in FIG. 3.

Specifically, by processing the image G3 acquired by the second camera 5, the image-processing unit 31 recognizes the first camera 4 and the workpiece W in the image G3, and detects a positional-displacement amount A between the recognized first camera 4 and workpiece W. For example, the image-processing unit 31 calculates the positional-displacement amount A between an optical axis (center line) L1 of the first camera 4 and the center line L2 of the workpiece W, as shown in FIG. 5.

The correcting unit 32 determines whether or not the detected positional-displacement amount A is greater than a prescribed threshold, and, in the case in which the positional-displacement amount A is greater than the threshold, calculates a time-correction amount ΔT by using the positional-displacement amount A detected by the image-processing unit 31 and the operating velocity of the robot 2.

For example, in the case in which the first camera 4 is displaced, by an amount corresponding to the positional-displacement amount A, in the operating direction of the robot 2 farther forward than the workpiece W is at the moment the first camera 4 captures the image of the workpiece W, the correcting unit 32 performs correction in which the time of image capturing is shifted to an earlier time by an amount corresponding to a time-correction amount ΔT calculated by means of expression (1) by using the positional-displacement amount A and an operating velocity V of the robot 2:

$$\Delta T = A/V \tag{1}.$$

An adjustment method for the robot system 1 according to this embodiment, thus configured, will be described below.

Figure 6:
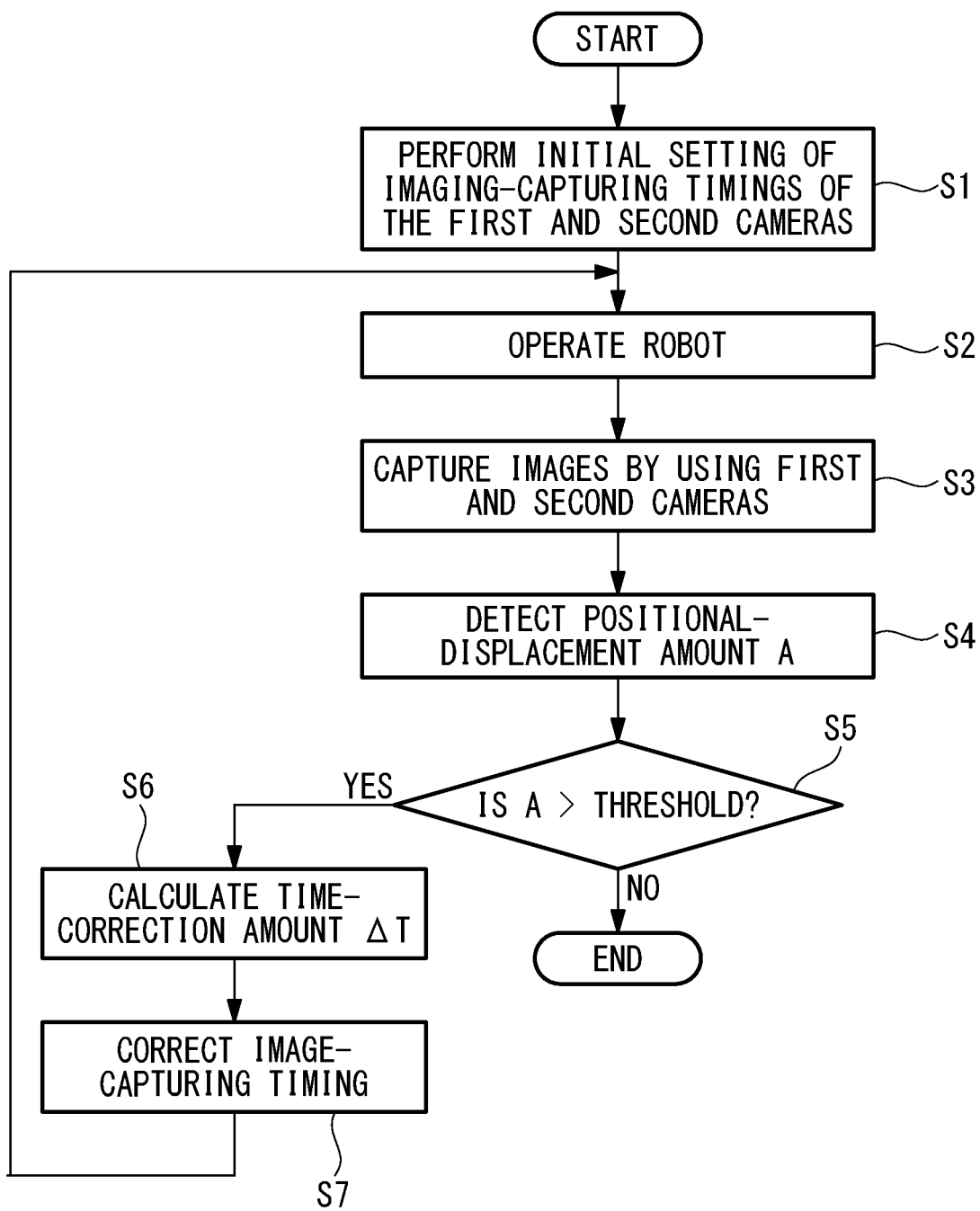
FIG. 6 is a flowchart showing an adjustment method of the robot system according to the embodiment of the present invention.

In the robot system 1 according to this embodiment, in order to adjust the image-capturing timing of the first camera 4 with respect to the workpiece W, first, initial setting is performed on the first camera 4 and the second camera 5 with respect to the image-capturing timing thereof, as shown in FIG. 6 (step S1).

The robot 2 is actuated in this state (step S2), the first camera 4 is made to capture the image of the workpiece W, and the second camera 5 is simultaneously made to capture the images of the first camera 4 and the workpiece W in synchronization with the operation of the first camera 4 (step S3).

In this state, the image G3 acquired by the second camera 5 is processed by the image-processing unit 31, and thus, the positional-displacement amount A between the first camera 4 and the workpiece W at the time at which the image was captured by the first camera 4 is detected (step S4).

The detected positional-displacement amount A is transmitted to the correcting unit 32, and it is determined whether or not the positional-displacement amount A is greater than the prescribed threshold (step S5). In the case in which the positional-displacement amount A is greater than the prescribed threshold, the time-correction amount ΔT is calculated by using expression (1) (step S6), the image-capturing timings of the first camera 4 and the second camera 5 are corrected by an amount corresponding to the time-correction amount ΔT (step S7), and the procedures from step S2 are repeated.

In step S5, in the case in which the positional-displacement amount A detected by the image-processing unit 31 is equal to or less than the prescribed threshold, the procedure is ended without performing the correction.

As has been described above, with the robot system 1 and the adjustment method therefor according to this embodiment, in the case in which the first camera 4 and the workpiece W are displaced from each other in the image G3 acquired by the second camera 5, the image-capturing timing of the first camera 4 is corrected by the correcting unit 32 on the basis of the image G3 acquired by the second camera 5. As a result, it is possible to acquire, by means of the first camera 4, the image G1 in which the workpiece W is appropriately captured in the field of view without having to halt or decelerate the robot 2 when capturing an image of the workpiece W, and thus, there is an advantage in that it is possible to reduce the cycle time.

In this embodiment, although a case in which the first camera 4 is attached to the robot 2 and an image is captured while moving the first camera 4 with respect to the workpiece W has been described as an example, alternatively, the present invention may be applied to a case in which the first camera 4 is secured outside the robot 2, and an image is captured by the first camera 4 when the robot 2 grips and moves the workpiece W with respect to the first camera 4.

In this embodiment, although the robot system 1 including the second camera 5 has been described, alternatively, a robot system 1 that does not include the second camera 5 as a constituent element and that includes an image-processing unit 31 that can be connected to the second camera 5 may be employed.

Regarding the second camera 5, although the case in which the second camera 5 is secured outside the robot 2 has been described as an example, alternatively, so long as it is possible to acquire the image G3 representing the relative positional relationship between the first camera 4 and the workpiece W, the second camera 5 may be attached at an arbitrary position. For example, the second camera 5 may be attached to the robot 2 together with the first camera 4. In this case, if the relative positional relationship between the first camera 4 and the second camera 5 is known, the second camera 5 need not capture the first camera 4 in the field of view thereof when capturing an image of the workpiece W.

In this embodiment, although the controller 3 includes the image-processing unit 31 that processes the image G3 acquired by the second camera 5, and the correcting unit 32 corrects the image-capturing timing on the basis of the positional-displacement amount A detected by the image-processing unit 31, alternatively, a user may manually correct the image-capturing timing by means of the correcting unit 32 on the basis of the image G3 acquired by the second camera 5.

As a result, the following aspect is derived from the above described embodiment.

An aspect of the present invention is a robot system including: a robot that performs work on a workpiece; a controller that controls the robot; a first camera that captures an image of the workpiece while being moved relative to the workpiece by means of the operation of the robot; and a second camera that is capable of acquiring, in synchronization with image capturing by the first camera, an image that represents the relative positional relationship between the first camera and the workpiece, wherein the controller includes a correcting unit that corrects, on the basis of the image acquired by the second camera, the image-capturing timing of the first camera so that an image is captured at a position at which the workpiece is appropriately captured in the field of view of the first camera.

With this aspect, when the robot is operated by means of the operation of the controller, the first camera and the workpiece are moved relative to each other. Also, as a result of the controller causing the first camera and the second camera to operate at the prescribed timings, the image that represents the relative positional relationship between the workpiece and the first camera is captured by the second camera at the timing at which the image of the workpiece is captured by the first camera. In the case in which the first camera and the workpiece are displaced from each other in the image acquired by the second camera, the image-capturing timing of the first camera is corrected by the correcting unit on the basis of the image acquired by the second camera, and thus, it is possible to acquire, by means of the first camera, an image in which the workpiece is appropriately captured in the field of view thereof. As a result, it is not necessary to halt or decelerate the robot when capturing an image of the workpiece, and thus, it is possible to reduce the cycle time.

Another aspect of the present invention is a robot system including: a robot that performs work on a workpiece; a controller that controls the robot; and a first camera that captures an image of the workpiece while being moved relative to the workpiece by means of the operation of the robot, wherein, in synchronization with image capturing by the first camera, the controller includes a correcting unit that corrects, on the basis of the image that represents the relative positional relationship between the first camera and the workpiece, and that is acquired by a second camera, the image-capturing timing of the first camera so that an image is captured at a position at which the workpiece is appropriately captured in the field of view of the first camera.

In the above-described aspect, the controller may include an image-processing unit that calculates a positional-displacement amount between the first camera and the workpiece by processing the image, and the correcting unit may calculate the time-correction amount on the basis of the positional-displacement amount calculated by the image-processing unit and an operating velocity of the robot.

With this configuration, as a result of the image acquired by the second camera being processed by the image-processing unit, the positional-displacement amount between the first camera and the workpiece is calculated. By dividing the positional-displacement amount calculated by the image-processing unit by the operating velocity of the robot, The correcting unit can calculate the time-correction amount, and, by shifting the image-capturing timing by an amount corresponding to the calculated time-correction amount, it is possible to correct, in a simple and highly precise manner, the image-capturing timing of the first camera so that an image is captured at a position at which the workpiece is appropriately captured in the field of view of the first camera.

In the above-described aspect, the first camera may be attached to the robot.

With this configuration, the first camera is moved in association with actuation of the robot, and the first camera and the second camera capture images at the moment at which the workpiece passes through the field of view of the first camera.

In the above-described aspect, the first camera may be secured to an installation surface of the robot, and the robot may handle the workpiece.

With this configuration, the workpiece is moved in association with actuation of the robot, and the first camera and the second camera capture images at the moment at which the workpiece passes through the field of view of the first camera secured to the installation surface of the robot.

Another aspect of the present invention is a robot system adjustment method including: capturing, while changing the position of a first camera relative to a workpiece by means of the operation of a robot, an image of the workpiece by means of the first camera; acquiring, by means of a second camera, an image that represents the relative positional relationship between the first camera and the workpiece in synchronization with the image capturing by the first camera; and correcting, on the basis of the image acquired by the second camera, the image-capturing timing of the first camera so that the image is captured at a position at which the workpiece is appropriately captured in the field of view of the first camera.

The invention claimed is:

1. A robot system comprising:
a robot that performs work on a workpiece;
a controller that controls the robot;
a first camera that captures an image of the workpiece while being moved relative to the workpiece by means of the operation of the robot;
a second camera that is capable of acquiring, in synchronization with image capturing by the first camera, an image that represents the relative positional relationship between the first camera and the workpiece, and
wherein the controller comprises a correcting unit that corrects, on the basis of the image acquired by the second camera, the image-capturing timing of the first camera so that an image is captured at a position at which the workpiece is appropriately captured in the field of view of the first camera.

2. A robot system comprising:
a robot that performs work on a workpiece;
a controller that controls the robot;
a first camera that captures an image of the workpiece while being moved relative to the workpiece by means of the operation of the robot, and
wherein, in synchronization with image capturing by the first camera, the controller comprises a correcting unit that corrects, on the basis of the image that represents the relative positional relationship between the first camera and the workpiece, and that is acquired by a second camera, the image-capturing timing of the first camera so that an image is captured at a position at which the workpiece is appropriately captured in the field of view of the first camera.

3. The robot system according to claim 1, wherein the controller comprises an image-processing unit that calculates a positional-displacement amount between the first camera and the workpiece by processing the image, and
the correcting unit calculates the time-correction amount on the basis of the positional-displacement amount calculated by the image-processing unit and an operating velocity of the robot.

4. The robot system according to claim 2, wherein the controller comprises an image-processing unit that calculates a positional-displacement amount between the first camera and the workpiece by processing the image, and the correcting unit calculates the time-correction amount on the basis of the positional-displacement amount calculated by the image-processing unit and an operating velocity of the robot.

5. The robot system according to claim 1, wherein the first camera is attached to the robot.

6. The robot system according to claim 2, wherein the first camera is attached to the robot.

7. The robot system according to claim 1, wherein the first camera is secured to an installation surface of the robot, and the robot handles the workpiece.

8. The robot system according to claim 2, wherein the first camera is secured to an installation surface of the robot, and the robot handles the workpiece.

9. A robot system adjustment method comprising:

capturing, while changing the position of a first camera relative to a workpiece by means of the operation of a robot, an image of the workpiece by means of the first camera;

acquiring, by means of a second camera, an image that represents the relative positional relationship between the first camera and the workpiece in synchronization with the image capturing by the first camera; and correcting, on the basis of the image acquired by the second camera, the image-capturing timing of the first camera so that the image is captured at a position at which the workpiece is appropriately captured in the field of view of the first camera.

* * * * *